Figure 2:
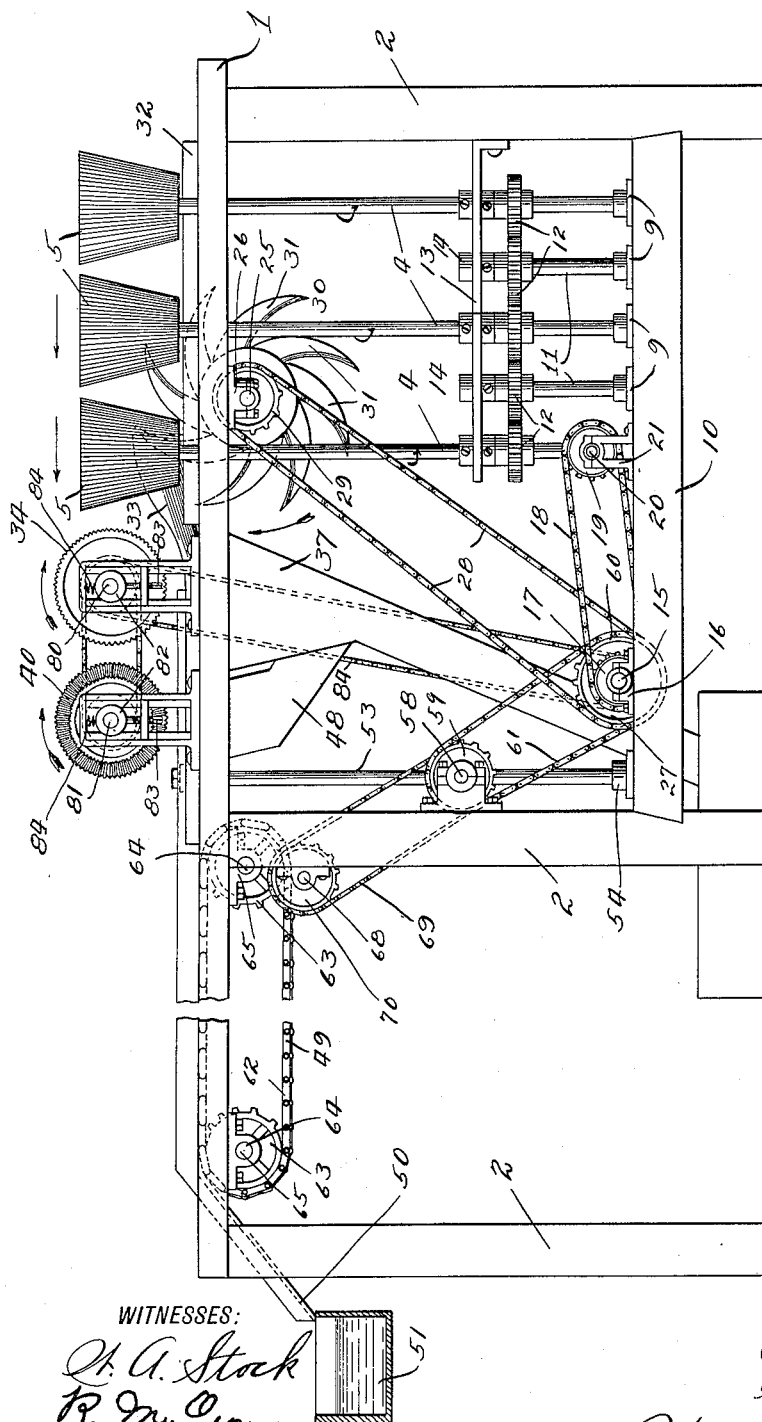

C. LETIN & F. FREY.
FISH SPLITTING MACHINE.
APPLICATION FILED MAR. 11, 1914.
1,138,300.
Patented May 4, 1915.
3 SHEETS—SHEET 1.
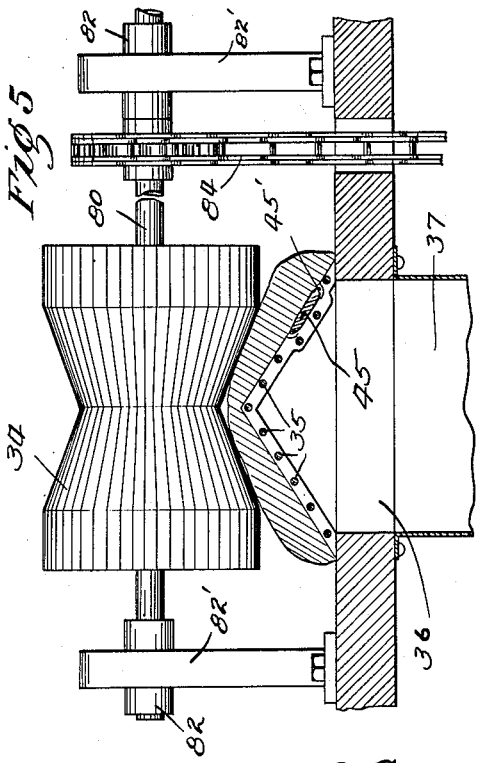
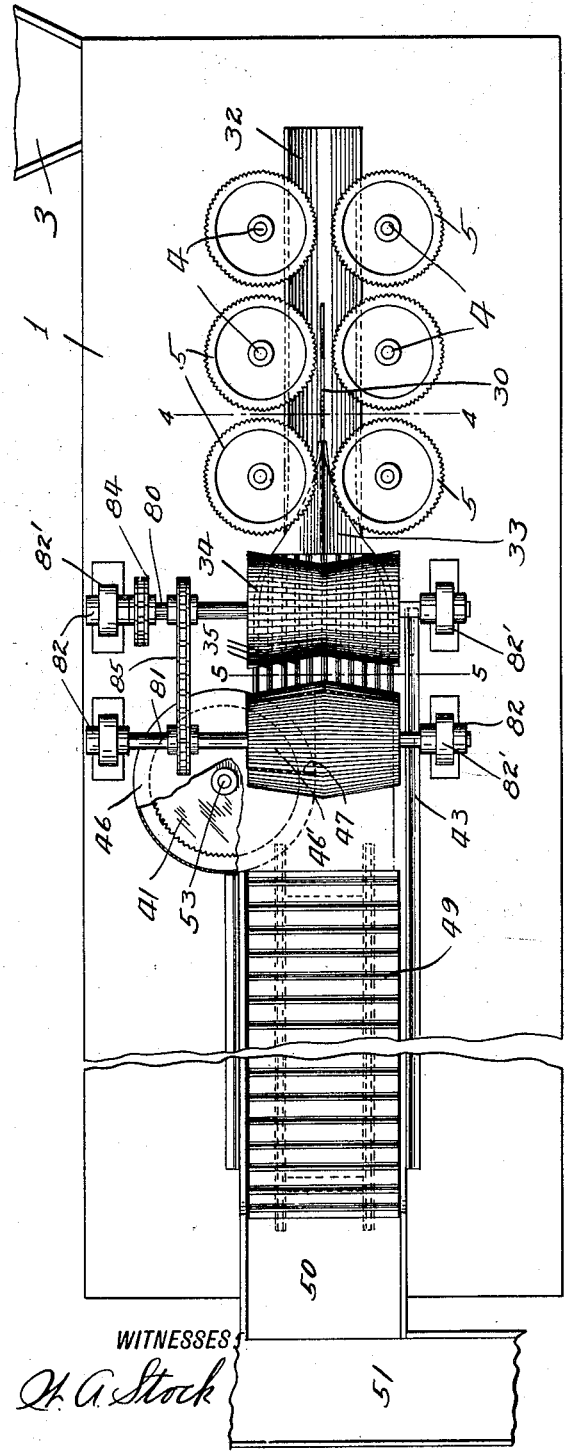
WITNESSES
H. A. Stock
Frank H. Carter
INVENTOR
Chris Letin
Fritz Frey
BY
Harry C. Schroeder
ATTORNEY

C. LETIN & F. FREY.
FISH SPLITTING MACHINE.
APPLICATION FILED MAR. 11, 1914.

1,138,300.

Patented May 4, 1915.
3 SHEETS—SHEET 2.

WITNESSES:

INVENTORS
ATTORNEY

C. LETIN & F. FREY.
FISH SPLITTING MACHINE.
APPLICATION FILED MAR. 11, 1914.
1,138,300.
Patented May 4, 1915.
3 SHEETS—SHEET 3.
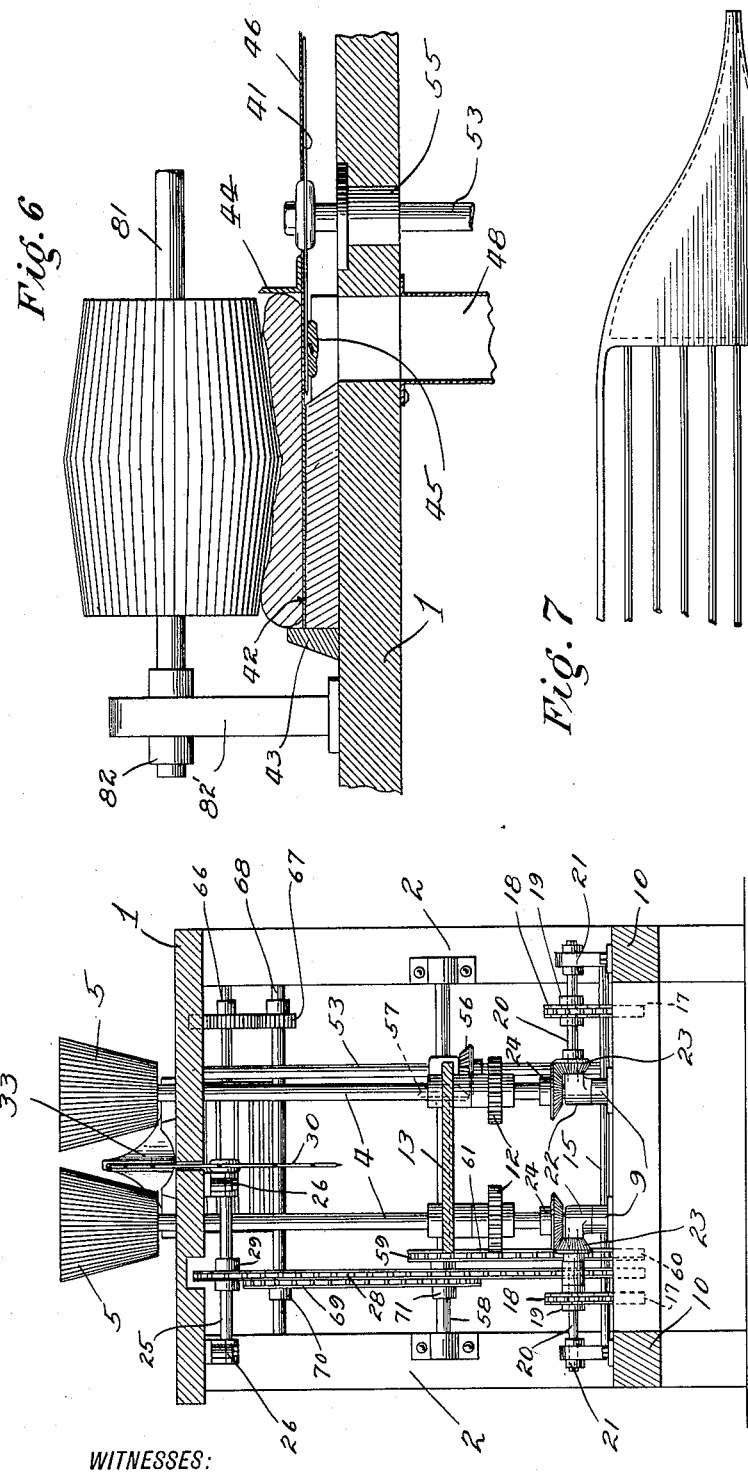

UNITED STATES PATENT OFFICE.

CHRIS LETIN AND FRETZ FREY, OF SAN FRANCISCO, CALIFORNIA.

FISH-SPLITTING MACHINE.

1,138,300.  Specification of Letters Patent.  Patented May 4, 1915.

Application filed March 11, 1914. Serial No. 823,892.

*To all whom it may concern:*

Be it known that we, CHRIS LETIN and FRETZ FREY, citizens of the United States, residing at San Francisco, in the county of San Francisco and State of California, have invented certain new and useful Improvements in Fish-Splitting Machines, of which the following is a specification.

This invention relates to an improved machine for operating on fish, which are intended to be preserved whole and in a flat condition.

The principal object of the invention is to provide a machine, which will split the fish longitudinally close to the back bone thereof, which will then flatten the fish and cut out the bone dropping the latter into a receptacle, and pass the fish on to a conveyer where it may be inspected and cleaned.

Our machine will perform the above operations economically and expeditiously and as no hand labor is used, is also more sanitary than the usual manner of handling the fish.

With these and other objects in view our invention consists in the novel construction and arrangement of parts as herein described and pointed out in the claims annexed.

For a full comprehension of our invention reference should be had to the accompanying drawings wherein, Figure 1 is a view in plan showing the feed chute from the heading machine, the splitting saw, flattening rolls, bone removing saw, the inspection table and conveyer. Fig. 2 is a view in side elevation showing the manner of driving the various mechanisms. Fig. 3 is a view in section taken in front of the first flattening roll. Fig. 4 is an enlarged sectional view showing the vertical gripping rolls and splitting saw. Fig. 5 is an enlarged sectional view showing the first horizontal flattening roll. Fig. 6 is a view in section showing the second horizontal flattening roll and the saw used to cut the bones from the fish. Fig. 7 is a view in plan of a curved plow-like device for spreading the fish.

Denoting corresponding parts by the same numerals of reference, 1 denotes a table supported on suitable legs 2, 3 a chute through which the fish are fed from the heading machine, 4 a plurality of vertically disposed shafts having mounted on the upper ends thereof the fluted conical rolls 5. These rolls are arranged in pairs so that the space therebetween is of such width that the fish is gripped by the fluted portion of the rolls. The upper ends of the rolls are supported in the table in a slidable bearing box 6, held in a supporting frame 7, and a spring 8 mounted between the bearing box and the rear end of the frame 7 urges this end of the shaft and supporting roll toward the center of the table and thereby enables the rolls to accommodate themselves to the varying sizes of the fish. The lower ends of the shafts 4 are supported in step bearings 9, resting on a cross member 10 and between the vertical shafts 4 are idler shafts 11. On the shafts 4 and shafts 11 are keyed the toothed gear wheels 12 all of the same diameter thus causing all the vertical shafts to revolve in the same direction and at the same speed. Above these gears is mounted a bearing plate 13 supported from the table and on suitable collars on the shaft 4. This strip contains bearings 14 wherein the upper ends of the idler shafts 11 are mounted, the shafts 4 passing through slits therein to allow a slight lateral movement when the rollers are pushed apart at the top. The main driving shaft is denoted by 15 being journaled in bearings 16 on the cross members 10. Keyed on this shaft are two toothed sprocket wheels 17 connected by chains 18 to similar toothed sprockets 19 mounted on shafts 20. The latter shafts are supported in bearings 21 and 22 and on the ends adjacent bearings 22 is keyed a beveled gear wheel 23, which meshes with the corresponding beveled gear 24 attached to one of the vertical shafts 4. A drive of this character is placed on each side of the machine so that the rotation of shaft 15 drives all the rolls 5 at a uniform speed.

Between the second and third pair of rolls 5 on the underside of the table a horizontal shaft 25 is mounted in bearings 26 and is driven by a sprocket 27 on the drive shaft 15 acting through the sprocket chain 28 on a similar sprocket 29 keyed to the shaft 25. On the end of the latter a little to one side of the center of the machine is mounted a saw 30 having spiral shaped teeth 31. These teeth are few in number, of large size and so sharpened as to produce a splitting rather than a sawing action as they pass through the fish.

Between the rolls 5 is a guide strip 32 on which the fish are supported with their backs resting in the curved groove 32'; back of the saw is a curved spreading device 33, which after the fish is split spreads the same as it is drawn under the roll 34. This device is narrow in front where it covers the upper part of the saw and fits closely to the sides thereof. As a fish is not entirely flattened by the time it reaches roll 34, the latter is of smaller diameter in the center to accommodate the partly flattened fish and is fluted in a manner similar to roll 5. At this point the fish is supported on a grill work of rods shown at 35, which is placed above an opening 36 in the table top, so that the loose matter on the inside of the fish has a chance to drop through the rods into the chute 37 and thus be carried away. After passing the roll 34 the fish passes under a roll 40 and the inner surface is thereby brought entirely flat preparatory to removing the bone. As the flesh adjacent the back is thicker than at the sides and as this portion now lies on the outside it is necessary to make this roll larger in diameter at the center tapering toward the outside edges where it contacts with the fleshy portion of the fish.

Rolls 34 and 40 are attached to shafts 80 and 81 respectively, journaled in bearings 82, which are slidably mounted in frames 82'. Adjustment of these bearings is secured by screws 83 and a spring 84 is interposed between the top of the bearing and the inside of the supporting frame. One of the shafts as 80 is driven by a sprocket chain 84 from a toothed wheel keyed to the drive shaft 15 and the other shaft is driven in like manner or by a short chain 85 from the first mentioned shaft. Mounted to one side of this roll is a saw 41 revolving in a horizontal plane and arranged to have its upper surface in alinement with the fish supporting runway 42, guides 43 and 44 being provided on the sides of this runway to hold the fish central with the roll. Supported in this manner the fish bone 45 projects below the surface of the runway and as it moves along by the action of roll 40, saw 41 enters between the fleshy portion of the fish and the bone severing the latter from the former.

Above the saw is a shield 46 having a cut out portion 46' directly under the roll, through which the saw may act on the fish. The forward edge 47 of this cut out portion acts to hold the fleshy portion from the saw and separate the bone from the flesh causing the former to drop into a suitable chute 48. After passing this roll the fish fall onto a moving conveyer 49 placed centrally in the supporting table terminating in an inclined chute 50 leading to a water trough 51. This table is of sufficient length so that the several operators may stand along the side thereof and lift the fish from the conveyer 49 for inspection and removal of any matter which might injure the keeping qualities of the same.

The saw 41 is mounted on the upper end of the vertical shaft 53, the same being journaled at 54 and 55. Intermediate these bearings the bevel wheel 56 is keyed thereto and meshing with this gear is a pinion 57 mounted on the end of the horizontally disposed shaft 58. This shaft is driven through sprockets 59 and 60 and a connecting chain 61 from the main drive shaft 15.

The conveyer 49 may be of any preferred construction, but we have illustrated the form having double connecting chains 62 carrying around the sprockets 63 mounted on the shafts 64, mounted in suitable bearings 65.

In order to cause the conveyer to travel in the correct direction we mount a toothed gear wheel 66 on one of the shafts 64, meshing with this gear we provide a toothed pinion 67 mounted on the shaft 68. This shaft in turn is driven by the chain 69 engaging the sprockets 70 and 71 mounted upon the shafts 68 and 58 respectively.

The operation of this machine is as follows:—As the fish slide down the chute 3 the operator holding the fish in a vertical position feeds them between the first pair of rolls 5 with the backs resting in the groove of guide 32. The rotation of these rolls feeds the fish forward to the second pair beyond which it encounters the cut saw 30. If this saw is placed a little to one side of the grooved guide 32 the saw will slit the fish to one side of the back bone as clearly illustrated in Fig. 4. After the slit has been made to its full depth the curved plate 33 enters therein and as the fish is moved forward by the last pair of rolls it becomes flattened and finally engaged by the roll 34. This roll assists to further flatten the fish and at the same time to feed it forward to the next roll where the bone is removed.

As shown in Fig. 5 the cross bars of the grill are provided with a depression 45' into which the bone may project. During the time which it moves across this grill under the pressure of roll 34 most of the undesirable matter drops through the latter into chute 37.

It will thus be apparent that from the time the fish enters the machine until the final inspection no manual work is necessary. We have thus provided a machine which will expeditiously handle a large quantity of fish where it is desired to cure the same in a flat condition.

While we have shown the preferred embodiment of our invention it will be understood that changes may be made in minor details and arrangement of parts without departing from the spirit thereof or sacrificing any of the advantages.

What we claim as new and wish to cover by Letters Patent is:—

1. In a machine of the character described comprising a table, means carried thereby for gripping fish and carrying the same forward, a knife adapted to slit the fish along the back to one side of the bone therein, means for flattening the fish and viscerating the same, and a saw adapted to sever the bone from the flattened fish.

2. In a machine of the character described comprising a table, a plurality of vertically disposed gripping rolls for carrying the fish forward, a vertically disposed knife having a plurality of splitting members, means partly inclosing said knife adapted to flatten said fish after being slit by said knife, and a horizontally disposed saw adapted to cut the bone from said fish after being flattened.

3. In a machine of the character described comprising a table, a plurality of vertically disposed shafts mounted therein, said shafts being arranged in two parallel rows, a grooved guide arranged centrally between said rows of shafting to receive fish to be operated upon, fluted conical rolls attached to the upper ends of said shafts, means for rotating said rolls so as to carry said fish forward, a knife rotating in a vertical plane mounted between said rows of rolls, a plurality of splitting edges carried by said knife, said knife being mounted to one side of the center of said grooved guide, a curved vane fitting over the rear portion of said knife adapted to spread and flatten the fish, openings in the flat portion of said vane adapted to viscerate the fish, and a saw rotating in a horizontal plane adapted to cut the bone from the flattened fish.

4. In a machine of the character described comprising a table, a plurality of vertically disposed guide rolls arranged in two rows above said table, a grooved guide central with said rows, a rotating splitting knife mounted in said groove to one side thereof so as to split the fish adjacent the bone thereof, a curved vane adapted to embrace the rear of said saw and enter the slit made by said knife said vane being shaped to spread the split fish, a horizontally disposed fluted roll above said spreading device, to continue the forward movement of said fish, a plurality of longitudinally disposed slots in said spreading device adapted to remove the viscera, a horizontally disposed saw adapted to cut the bone from the flesh, a fluted roll above said saw adapted to hold the fish flat upon said saw, spring mounted journals for said horizontal rolls to allow for varying sized fish and means for driving said saw, said cutter and said rolls.

5. In a machine of the character described for splitting, cleaning, flattening and removing the bone from fish comprising in combination a table, a plurality of vertically disposed shafts arranged in two parallel rows slidable journals carrying the upper end of said shafts, springs to allow the outward movement of said journals, inverted conical fluted rolls carried by said shafts above said table, a grooved guide central between said rows of rolls, means for driving said rolls to urge the fish forward in said guide, a splitting saw mounted between said rolls and extending through said groove, said saw comprising a plurality of curved knives adapted to split the fish adjacent the backbone with a chopping action, a curved device adapted to enter the slit thus made and flatten the split fish, horizontal rolls in front of said flattening device, the said last mentioned rolls being fluted and shaped to conform to the outlines of the fish at the point above which they are mounted, spring mounted journals carry the shafts of said horizontal rolls, a horizontally disposed saw adapted to sever the exposed bone from the flesh, and means for lifting this flesh from the saw.

In testimony whereof we affix our signatures in presence of two witnesses.

CHRIS LETIN.
FRETZ FREY.

Witnesses:
W. A. STOCK,
R. M. OYARZO.